S. CLARK.
Horse Hay-Fork.

No. 99,292.

Patented Feb. 1, 1870.

WITNESSES

INVENTOR

United States Patent Office.

SIMEON CLARK, OF HOWARD, NEW YORK.

Letters Patent No. 99,292, dated February 1, 1870.

---

IMPROVEMENT IN HORSE HAY-FORKS.

---

The Schedule referred to in these Letters Patent and making part of the same

---

To all whom it may concern:

Be it known that I, SIMEON CLARK, of Howard, in the county of Steuben, and State of New York, have invented a new and improved Horse Hay-Fork; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
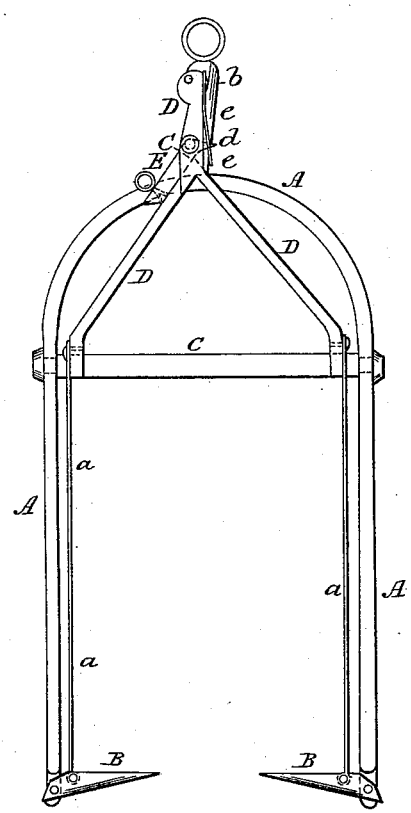
Figure 1 represents a side view of my improved horse hay-fork.
Figure 2:
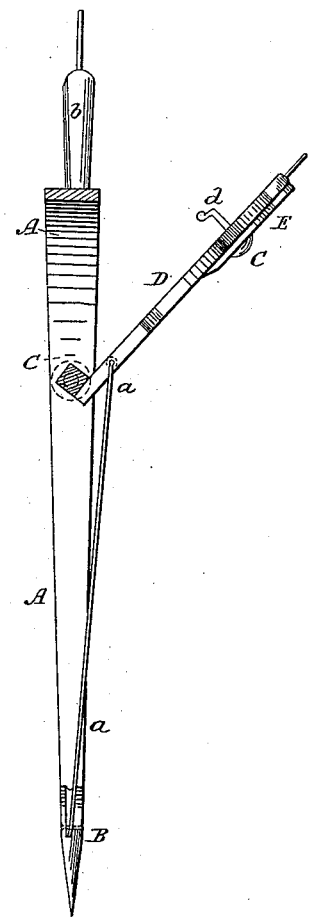
Figure 2 is a vertical transverse section of the same.

This invention relates to certain improvements in the horse hay-fork, for which Letters Patent No. 72,286 were granted to J. S. Gochnauer on the 17th day of December, 1867, and consists in a new fastening-device, to be more particularly described hereinafter.

A, in the drawing, is the bow, which forms the shanks of the fork. To its ends are pivoted the toes B B, which are, by means of rods $a$, connected with a rocking-bar, C, which is hung between the bars of the bow.

All these parts are as described in the said Letters Patent.

From the rocker projects a frame or bar, D, which, when the toes are in the carrying-position, lies with its upper end against the arm $b$ that projects from the middle of the bow, as shown.

To the bar D is pivoted, at $c$, a short lever, E, which carries a hook, $d$. When the fork descends into the hay, the frame D is swung up against the bow, and then the lever E is swung down, as in fig. 1, so as to carry its hook $d$ around the arm $b$, thereby locking the toes in the horizontal position.

When the fork has arrived, with its load, over the desired place, a string, passing from the lever E and through the upper end of the frame D, is pulled, so that it will turn the frame E up, to detach the hook from the arm $b$. The weight of the hay will then swing the toes down, and cause the discharge of the load.

A spring, $e$, holds the lever E in either position.

Having thus described my invention,

I claim as new, and desire to secure by Letters Patent—

The arrangement of lever E, hook $d$, and arm $b$, to fasten the vibrating frame D of the hay-fork, in the manner described, and for the purpose specified.

SIMEON CLARK.

Witnesses:
  ORA WHITFORD,
  GEORGE BARDEEN.